United States Patent [19]
Holt

[11] 3,943,709
[45] Mar. 16, 1976

[54] SUBSTOICHIOMETRIC AIR ADDITION TO FIRST STAGE OF DUAL CATALYST SYSTEM

[75] Inventor: Eugene L. Holt, Elmhurst, N.Y.

[73] Assignee: Exxon Research & Engineering Co., Linden, N.J.

[22] Filed: Dec. 29, 1972

[21] Appl. No.: 319,842

Related U.S. Application Data

[63] Continuation-in-part of Ser. No. 217,367, Jan. 12, 1972, abandoned.

[52] U.S. Cl. .................. 60/274; 60/284; 60/289; 60/301
[51] Int. Cl.² ........................................ F02B 75/10
[58] Field of Search ............ 60/301, 289, 284, 274, 60/290

[56] References Cited
UNITED STATES PATENTS

| | | | |
|---|---|---|---|
| 1,902,160 | 3/1933 | Frazer | 60/301 |
| 3,106,820 | 10/1963 | Schaffer | 60/290 |
| 3,109,715 | 11/1963 | Johnson | 60/299 |
| 3,544,264 | 12/1970 | Hardison | 60/301 |
| 3,565,574 | 2/1971 | Kearby | 60/301 |
| 3,662,540 | 5/1972 | Murphey | 60/289 |
| 3,665,711 | 5/1972 | Muroki | 60/290 |
| 3,757,521 | 9/1973 | Tourtellotte | 60/286 |
| 3,771,562 | 11/1973 | Curran | 137/625.48 |
| 3,826,089 | 7/1974 | Nakajima | 60/289 |

*Primary Examiner* — Douglas Hart
*Attorney, Agent, or Firm* — L. F. Kreek; Wayne Hoover

[57] ABSTRACT

Process and apparatus for reducing emissions from internal combustion engine exhaust gas. The exhaust gas treatment system includes a first stage converter containing an $NO_x$ reduction catalyst, a second stage converter containing a catalyst for oxidation of CO and hydrocarbons, and means for admitting secondary air to the inlet of the second stage. Reduced CO and hydrocarbon emissions are obtained by admitting air in an amount not greater than that required to achieve a stoichiometric mixture to the inlet of the first stage during cold (i.e., choked) engine operation, discontinuing the flow of air to the first stage inlet when the average air-fuel ratio reaches approximately its normal warm engine value, and thereafter continuing operation without adding an appreciable quantity of air to the inlet of the first stage. The engine is operated with a substantially net rich average air-fuel ratio during warmup and with a slightly net rich average air-fuel ratio thereafter.

6 Claims, 4 Drawing Figures

SUBSTOICHIOMETRIC AIR ADDITION TO FIRST STAGE OF DUAL CATALYST SYSTEM

BACKGROUND OF THE INVENTION

This application is a continuation-in-part of my copending application Ser. No. 217,367, filed Jan. 12, 1972, now abandoned.

This invention relates to processes and apparatus for the removal of pollutants from the exhaust gas of internal combustion engines. More particularly, the present invention relates to a process and system which is capable of removing substantial quantities of nitrogen oxides, carbon monoxide and unburned hydrocarbons from the exhaust gas of an internal combustion engine.

Exhaust gases from automobile engines constitute a major source of air pollution. Among the undesirable constituents are carbon monoxide, unburned hydrocarbons and nitrogen oxides. Early attention to the abatement of pollution caused by automotive exhaust gas was directed primarily to the conversion of carbon monoxide and unburned hydrocarbons into innocuous substances. More recently, attention has also been directed to the reduction in nitrogen oxide levels.

Among the references disclosing the treatment of internal combustion engine exhaust gas in order to reduce the quantity of carbon monoxide and hydrocarbons are U.S. Pat. Nos. 1,789,812, 1,875,024 and 1,902,160. As these references indicate, secondary air is added to an internal combustion engine exhaust gas stream in an amount sufficient to oxidize all of the carbon monoxide and hydrocarbons therein to carbon dioxide and water vapor. The mixture of exhaust gas and air is then contacted with a suitable catalyst which oxidizes the combustible constituents, e.g., carbon monoxide and hydrocarbons. U.S. Pat. No. 1,875,024 teaches that the amount of air may be automatically controlled either by gas flow or thermostatically to provide sufficient air for oxidation and to control the catalyst temperature. U.S. Pat. No. 1,902,160 describes the method of activating an oxidation catalyst (copper chromite) so that its "starting temperature," i.e., the temperature at which it catalyzes the oxidation of carbon monoxide, is lowered. The patentee found that this could be accomplished by subjecting the catalyst to a reducing atmosphere. In one mode of operation, exhaust gas is passed through a bed of oxidation catalyst and air is added to the exhaust gas stream at two spaced points, one at the inlet of the catalyst bed, the other at an intermediate point in the catalyst bed. The amount of air added at the inlet end of the catalyst bed is less than stoichiometric so that the portion of the catalyst bed upstream of the second air inlet is under reducing conditions; this portion of the catalyst becomes effective more rapidly than the downstream portion when the engine is started cold.

An article by J. F. Roth et al in "Industrial and Engineering Chemistry," Vol. 53, pp. 293–296 (1961), describes the reduction of nitrogen oxides, carbon monoxide and hydrocarbons in exhaust gases in either a single stage or a dual stage catalyst system. In the single stage studies, the effect of various amounts of added air ranging from zero to greater than stoichiometric was studied using a chromite catalyst. The authors found that nitrogen oxide conversion fell off when the amount of air was greater than the stoichiometric quantity for the conversion of the carbon monoxide present. On the other hand, carbon monoxide and hydrocarbons were found to be oxidized efficiently only when an excess of air was present. The authors suggested that all three pollutants could be efficiently removed in a two-stage treatment in which exhaust is first treated without added air to remove NO, and then with added air to remove CO and hydrocarbons.

Subsequent investigators have confirmed that the most efficient removal of all three pollutants is obtained in a two-stage system. U.S. Pat. No. 3,493,325 provides a further illustration of a two-stage catalyst system for removal of nitrogen oxides, carbon monoxide and hydrogen from an exhaust gas stream. According to this patent, the exhaust gas is treated in a first catalytic zone without addition of secondary air in order to reduce nitrogen oxides, followed by addition of secondary air and catalytic oxidation of carbon monoxide and hydrocarbons. A similar mode of operation is also described by G. H. Meguerian et al., Society of Automotive Engineers, Paper No. 710291 (Automotive Engineering Congress, Detroit, Mich., Jan. 11–15, 1971), who disclose various $NO_x$ reduction catalysts. A particularly good $NO_x$ reduction catalyst is "Monel," a nickel-copper alloy, which is disclosed in U.S. Pat. No. 3,565,574 and in L. S. Bernstein et al., SAE Paper No. 710014 (Automotive Engineering Congress, Detroit, Mich., Jan. 11–15, 1971), and in SAE Paper No. 710291, supra.

A recent article by T. V. DePalma in "Automobile Engineer," Vol. 23, No. 27 (October, 1971), describes the catalytic conversion of nitrogen oxides, carbon monoxide and hydrocarbons in a single stage catalyst system containing a precious metal catalyst with injection of secondary air into the exhaust manifold. Data show that $NO_x$ conversion is best at stoichiometric air-fuel ratio, dropping rapidly in the net lean region (i.e., greater than stoichiometric air) and less rapidly in the net rich region as the air-fuel ratio is varied from stoichiometric.

One problem that has not been completely met by any exhaust gas treatment systems proposed to data is the problem of effectively reducing air pollutants during cold engine operation. When an automobile engine is started cold, the choke is fully or partially closed so as to provide a very rich air-fuel mixture to the engine. A typical air-fuel ratio at this stage of operation may be about 10–12, compared to a stoichiometric air-fuel ratio of about 14.7 pounds of air per pound of fuel. The exhaust gas just after a cold start is quite rich in carbon monoxide and hydrocarbons. Furthermore, the catalysts in the exhaust gas treatment system are not effective at ambient temperature. As the engine warms up, the choke gradually opens, the air-fuel mixture becomes leaner and the amount of carbon monoxide and unburned hydrocarbons in the exhaust is reduced. However, there is an appreciable quantity of carbon monoxide and hydrocarbons, and a definitely substoichiometric quantity of oxygen in the exhaust gas throughout the cold engine or warmup phase of engine operation. Nitrogen oxide production is less during cold engine operation than during warm engine operation, due in part to the rich fuel mixture, but nevertheless is undesirably high in many cases. The exhaust gas treatment catalysts gradually become more active as they are warmed up. The oxidation catalyst in a dual catalyst system warms up more slowly than the reduction catalyst because of the absorption of heat from the exhaust gas stream by the reduction catalyst. Substantial quantities of carbon monoxide and hydrocarbons are emitted from the vehicle before the oxidation catalyst is warmed up to maximum effectiveness. Furthermore, the strongly net reducing conditions which prevail during cold engine operation promote the reduction of nitrogen oxides to ammonia in the presence of the reduction catalyst. Ammonia formation is undesirable because ammonia is catalytically oxidized to nitric oxide in the presence of the oxidation catalyst. Thus, overall conversion of nitrogen oxides is lower in a dual catalyst system during cold engine operation than during warm engine operation.

This invention provides a method and apparatus for treating exhaust gases so that emissions of nitrogen oxides, carbon monoxide and hydrocarbons are held down to acceptable levels even during the warmup phase of engine operation.

SUMMARY OF THE INVENTION

This invention provides a novel process and apparatus for controlling the emission of nitrogen oxides, carbon monoxide and hydrocarbons from the exhaust gas of an internal combustion engine, particularly during cold engine operation.

According to the process of this invention, a not greater than stoichiometric quantity of air is added to engine exhaust during cold engine operation and the resulting mixture is catalytically treated under reducing conditions to reduce the quantity of nitrogen oxides in the exhaust. A further quantity of air at least stoichiometrically equivalent to the amount of CO present is then added and the exhaust gas is further treated under net oxidizing conditions to reduce the quantities of CO and hydrocarbons therein. As the engine warms up and reaches approximately normal operating temperature, the supply of air upstream of the first catalytic converter is shut off, and in further operations the exhaust gas is passed through the first catalytic conversion zone without the addition of secondary air in order to reduce the quantity of nitrogen oxides, and then is passed with added secondary air under net oxidizing conditions through the second conversion zone where CO and hydrocarbons are oxidized.

The apparatus of this invention includes, in combination with a first converter for reducing nitrogen oxides, a second converter for oxidizing carbon monoxide and hydrocarbons, and a secondary air inlet for admitting air to the second converter, the improvement comprising means for supplying a not greater than stoichiometric quantity of air to the first converter during engine warmup, and means for substantially shutting off the supply of air to the first converter when the average air-fuel ratio reaches approximately its warm engine value.

THE DRAWINGS

DESCRIPTION OF THE PREFERRED EMBODIMENT

Figure 1:
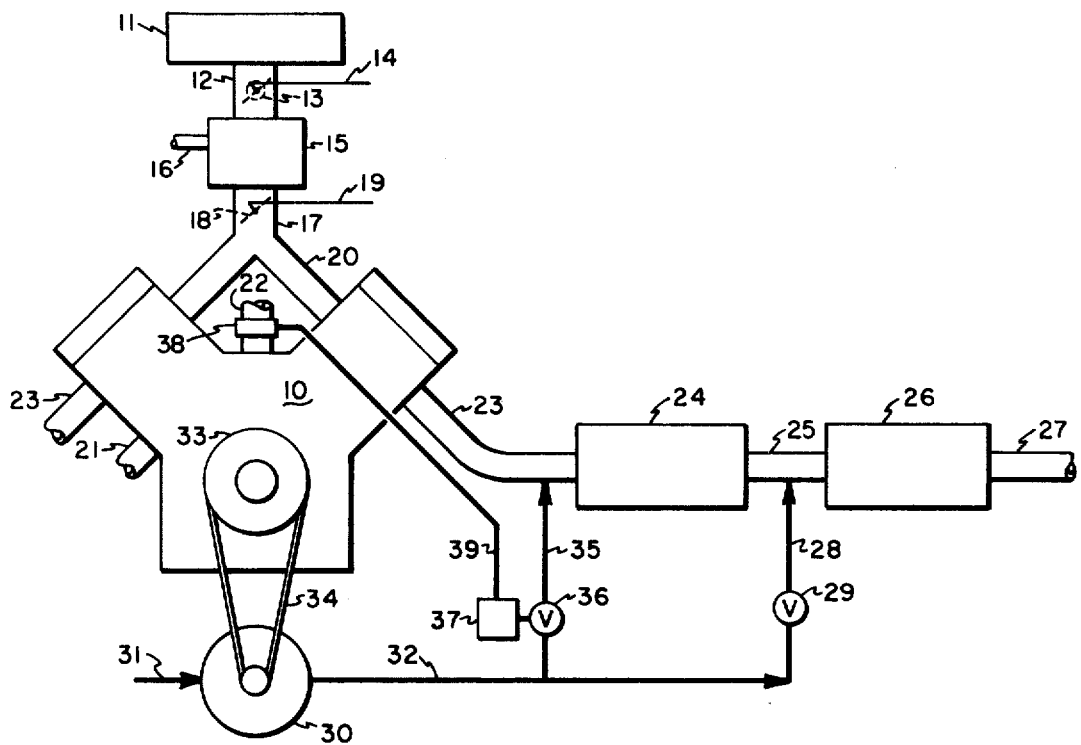
FIG. 1 is a schematic drawing of an automobile engine including the exhaust gas treatment system of this invention.

Referring now to FIG. 1, there is shown a V-8 automobile engine 10 having a system for supplying an air-fuel mixture which includes an air cleaner 11, an air duct 12 having a choke valve 13, means 14 (which may be either manual or automatic) for controlling the position of the choke, a carburetor 15 having a fuel supply 16, a fuel mixture duct 17 having a throttle valve 18 therein, means 19 for controlling the movement for throttle valve 18, and intake manifolds 20 for supplying the air-fuel mixture to the cylinders of engine 10. The engine may also have a cooling water supply line 21, leading from a radiator (not shown) and a cooling water return line 22 leading to the radiator. It will be appreciated that the system shown is capable of supplying a mixture of air and fuel having a variable air-fuel ratio.

The exhaust gas system for engine 10 includes a pair of exhaust manifolds 23, only one of which is shown in detail. The exhaust gas treatment system includes a first stage catalytic converter or conversion zone 24 in which nitrogen oxides are reduced, a duct 25 which receives the effluent of the first stage converter 24, a second stage converter or conversion zone 26, which is preferably catalytic converter, for oxidizing carbon monoxide and hydrocarbons, and a tail pipe 27 for the discharge of treated exhaust gas to the atmosphere. The tail pipe 27 is normally connected to a muffler (not shown), through which gas is passed before discharge into the atmosphere.

A secondary air supply duct 28 supplies to the second stage converter 26 a quantity of air equal to or greater than the stoichiometric quantity for complete oxidation of all oxidizable impurities in the gas, such as carbon monoxide and unburned hydrocarbons. The air supplied through duct 28 to the second stage converter 26 will be referred to as "second stage air" in this specification. The air duct 28 may have a check valve 29 to prevent back flow of exhaust gases. This air duct 28 receives air from an air pump 30 having an atmospheric air inlet 31 and an outlet 32, to which duct 28 is connected. Pump 30 is driven by the engine crank shaft 33 through a conventional belt or pulley 34.

It will be appreciated that the converters 24 and 26 must be duplicated in a system having two exhaust manifolds; in vehicles having a single exhaust manifold (e.g., a vehicle having a straight 4- or 6-cylinder engine), the system will include only one converter 24 and one converter 26.

The portion of this system described up to this point is either conventional or known in the art, as illustrated by the references cited earlier in this application.

The system of the present invention includes an auxiliary air duct 35 for supplying air in an amount not greater than stoichiometric to the inlet of first stage converter 22. The air supplied through duct 35 to the first stage converter 22 will be referred to as "first stage air." As shown, the air duct 35 introduces air into the exhaust gas stream in the exhaust gas manifold 23 a short distance upstream of the inlet of first stage converter 24. Means for admitting first stage air through duct 35 to the first stage converter 22 during cold engine operation, and for shutting off the supply of first stage air through duct 35 when the engine reaches substantially normal warm engine conditions are provided. In the preferred embodiment shown, this means includes a valve 36, controlled by a solenoid or other suitable operator 37, which in turn is responsive to engine temperature. Such control may be effected by a temperature sensitive device 38 located in the cooling water and an operative connection between the temperature sensing device 38 and the solenoid 37. The temperature sensing device 38 may be of known construction, as for example, a temperature-responsive microswitch which makes or breaks an electrical circuit (indicated diagrammatically by wire 39) which controls solenoid 37.

Figure 2:
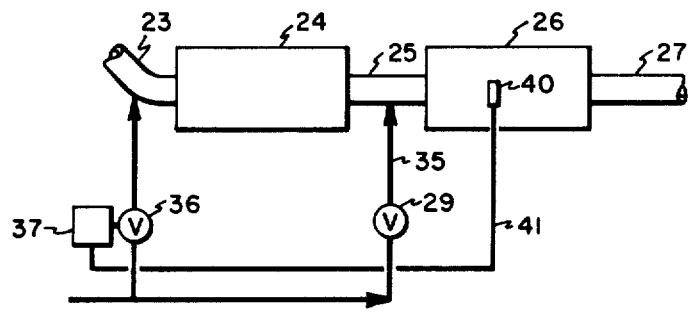
FIG. 2 is a partial schematic drawing of an exhaust gas treatment system according to this invention showing alternate means for controlling the air supply to the nitrogen oxide converter.

FIG. 2 shows a modified form of the invention in which the temperature-responsive device, which in this instance may be in the form of a thermocouple 40 located in the second stage converter 26 and electrically connected to solenoid 37 through an electrical circuit 41 (which is shown diagrammatically).

Figure 3:
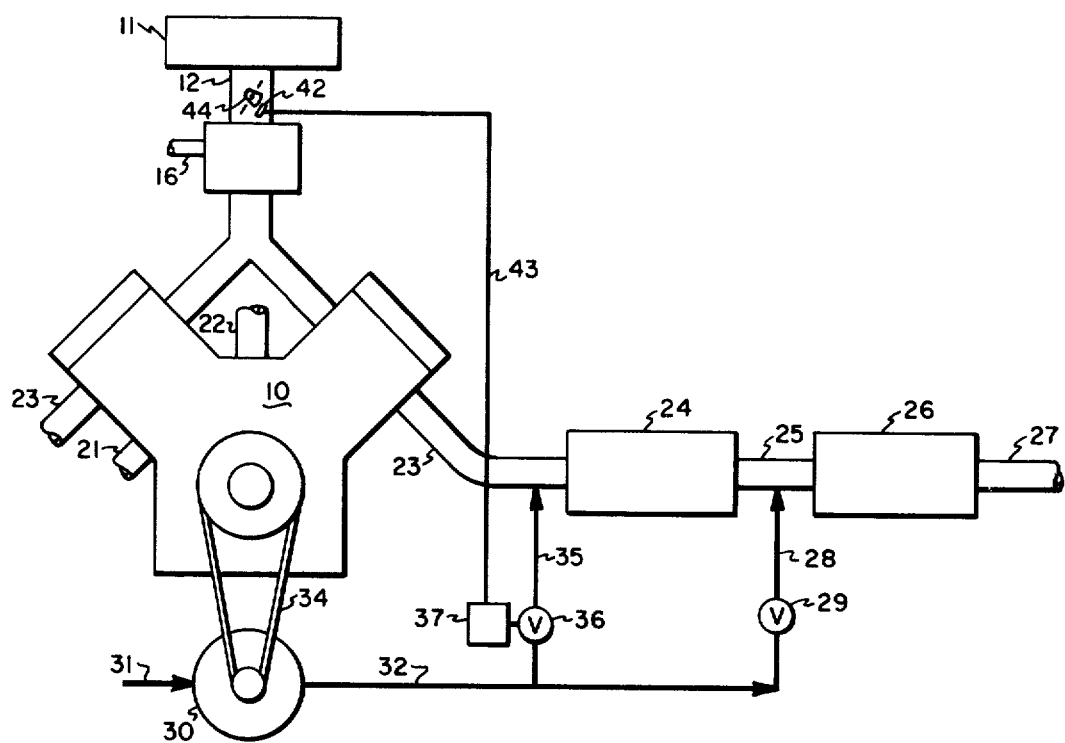
FIG. 3 is a partial schematic drawing of an exhaust gas treatment system according to this invention showing another alternative means for controlling the air supply to the nitrogen oxide converter.
Figure 4:
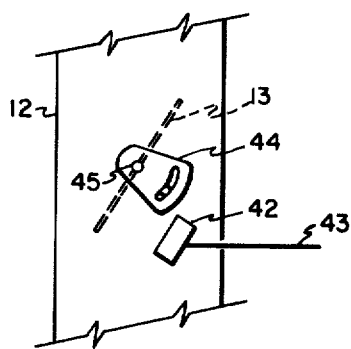
FIG. 4 is a detail drawing showing a portion of the system of FIG. 3 on an enlarged scale.

FIGS. 3 and 4 show another modified form of the invention in which the solenoid 37 is controlled in response to the position of choke 13. According to this embodiment, a position responsive switch 42 is mounted on the exterior of the air duct or barrel 12; the closing of this switch allows current to flow through electrical circuit 43, energizing the solenoid 37. As shown in FIG. 4, the position responsive switch 42 may be opened and closed by the movements of a cam 44 (which may be conventional) secured to choke shaft 45 on the exterior of the air duct or barrel 12.

All of the above mechanisms will cause auxiliary air to be supplied via duct 35 during cold engine operation and to be shut off (or substantially shut off) during warm engine operation. Although the opening and closing of valve 36 is tied directly to the choke position (which determines the air-fuel ratio) in the embodiment of FIG. 3, a good indication of cold engine versus warm engine conditions can be obtained by either measuring cooling water temperature as in FIG. 1, or by measuring the temperature in the second stage converter 26, as shown in FIG. 2. There is a time lag between the start of the engine and the warming up of the catalyst in converter 26 to full operating temperature which correlates well with the time required to warm up the engine to the point where choked operation is no longer necessary.

The solenoid 37 which controls valve 36 can be replaced by a diaphragm or other suitable operating mechanism.

If desired, valve 36 may be a variable orifice valve. In this case, valve 36 will normally be controlled so as to be wide open when the engine is started cold. As the engine warms up to normal operating temperature, the orifice size will gradually be restricted so as to reduce the flow rate of auxiliary air through duct 35. When the engine reaches substantially warm engine conditions, the valve 36 will be substantially closed and preferably will be entirely closed. If the structure of valve 36 does not permit complete closure of duct 35, as for example in the case of a butterfly valve, the air-fuel mixture fed to the engine should be adjusted so that an average net rich condition will be maintained in first stage converter 24. Preferred valve structures are those which permit complete closure, and suitable structures are known in the art.

Known catalysts can be used in both the first stage (nitrogen oxide) converter 22 and in the second stage (carbon monoxide and hydrocarbon) converter 26. A preferred reduction catalyst for the first stage converter 22 is an alloy of nickel and copper, such as a "Monel" alloy, containing from about 40 to about 95% by weight of nickel and about 5 to about 60% by weight of copper. This alloy may be either unsupported or on a suitable base or support. A high temperature and oxidation resistant metallic base such as stainless steel is particularly suitable. Suitable bases and supports are materials which will retain their structural integrity in an exhaust gas atmosphere at temperatures up to at least about 1600° to 1800°F. The nickel-copper alloy can also be supported on a ceramic carrier such as alumina, which preferably has a surface area less than about 5 square meters per gram.

Other known nitrogen oxide reduction catalysts, as for example, nickel and chromites such as manganese chromite and copper chromite may also be used as catalysts in converter 22. These catalysts may be supported if desired on a suitable heat and oxidation resistant support which will retain its structural integrity at temperatures up to about 1600° to 1800°F. or higher. Various support materials, including "Nichrome" stainless steel, alumina (preferably of low surface area, less than about 5 square meters per gram), etc., are known in the art.

The second stage catalytic converter 26 may contain any suitable oxidation catalyst which is capable of catalyzing the oxidation of carbon monoxide and hydrocarbons to harmless substances. i.e., carbon dioxide and water, at exhaust gas temperatures. Various catalysts for this purpose are known in the art. A particularly desirable oxidation catalyst is platinum on a suitable ceramic support, such as platinum on a cordierite honeycomb, sold by Engelhard Mineral and Chemicals Corporation, Newark, N.J., under the designation "PTX." Other oxidation catalysts for engine exhaust gas treatment are known in the art and may be used in the practice of this invention. Faster warmup of the oxidation catalyst converter 26 can be promoted by splitting the oxidation catalyst into two portions, the first portion being a body of comparatively small mass near the inlet end of the converter 26, and electrically heating this first portion during engine warmup. This first portion of catalyst is electrically insulated from the second and main portion of catalyst, and from the converter housing. By heating the first portion of catalyst 49 electrically, oxidation of the reducing components of the exhaust gas, such as carbon monoxide and hydrocarbons, can be initiated before the main portion of catalyst is warmed up to the temperature at which it is active. This will cause more rapid warmup of the main portion of catalyst due to heat of reaction on the first portion and thereby reduce the amount of carbon monoxide and hydrocarbons discharged from the exhaust gas treatment system.

The operation of the exhaust gas treatment system will now be described.

Starting with a cold engine 10, a very rich air-fuel mixture, typically having an air-fuel ratio of only about 10-12 (compared to a stoichiometric air-fuel ratio of approximately 14.7) is supplied to the engine 10. Such an air-fuel mixture can be obtained by means known in the art, as for example, by substantially closing the choke 13. The resulting exhaust gas contains a considerable quantity of carbon monoxide and hydrocarbons, and has a very low free oxygen content.

In the practice of this invention, a not greater than stoichiometric amount, and preferably a substoichiometric amount, of first stage auxiliary air is supplied through duct 35 and introduced in admixture with the exhaust gas into the inlet of first stage conversion zone 24. This air oxidizes a portion of the reducing constituents of exhaust gas, which provides heat to warm up both catalysts faster and also provides an atmosphere which is only mildly reducing and which is therefore favorable to the conversion of most of the nitrogen oxide content of the exhaust gas to nitrogen rather than to ammonia. The amount of air may be controlled as desired, provided the average content of exhaust gas remains net reducing. There may be brief excursions into the net oxidizing region, as for example, when a car is driven under high speed cruise conditions while the engine is still cold, and such excursions, if not prolonged, do not adversely affect the functioning of the catalyst.

As the engine warms up, the air-fuel ratio is increased, usually gradually. This can be accomplished in a car having a conventional carburetor by gradually opening the choke 13 wider. Various automatic choke devices and control mechanisms for accomplishing this are known in the art. Also, the choke can be opened manually as the engine warms up, as is well known. When the average air-fuel mixture supplied to the engine 10 reaches a value which is characteristic of warm engine operation (i.e., only slightly substoichiometric, as for example when the choke 13 has been opened to full open or nearly full open position), it is no longer desirable to supply auxiliary air to the inlet in the first stage conversion zone 24. In fact, it is no longer possible to supply any appreciable quantity of auxiliary air through line 35 under these conditions without causing the gas mixture in the first stage conversion zone 24 to be net oxidizing. The valve 36 which controls the air supply through line 33 is therefore closed when the engine 10 reaches substantially normal warm engine conditions. This can be accomplished by sensing the cooling water temperature in line 22 or the exhaust gas temperature in the second stage conversion zone 26, or by sensing the position of the choke 13, as has already been described.

In one preferred embodiment, valve 36 is a variable orifice valve so that the amount of air flow through duct 35 can be gradually decreased as the air-fuel ratio to the engine 10 is gradually increased. This makes possible optimum control of the richness (i.e., the excess of reducing components over oxygen and nitrogen oxides) in the first stage conversion zone 24. On the other hand, a simple on-off valve 36 has the advantage of mechanical simplicity. In no case should the amount of oxygen in the first stage be greater than stoichiometric, except for brief excursions. Preferably the amount of oxygen entering the first stage converter 24 is about 50-100% of stoichiometric. As explained previously, brief excursions into the oxidizing region do not substantially impair the efficiency of nitrogen oxide conversion.

Secondary air is supplied to the second stage conversion zone 26 at all times during the operation of the engine 10. The amount of second stage air supplied through duct 28 is sufficient to provide at least a stoichiometric quantity of oxygen, and preferably a slight excess of oxygen, in the oxidation zone 26.

While this invention has been described with particular reference to an engine equipped with a conventional carburetor 15 and choke 13, it will be understood that the present invention is also applicable where a variable air-fuel mixture in the engine is obtained in other ways, e.g., by fuel injection.

The exhaust gas treatment system of this invention in intended for use in conjunction with any internal combustion engine or other power plant in which the exhaust gas contains a substantial excess of reducing constituents (e.g., carbon monoxide, unburned hydrocarbons, and hydrogen) during certain portions of engine operation (e.g., cold engine operation), and a smaller excess of reducing constituents during other portions of engine operation (e.g., normal temperature operation). It will be understood that the engine herein may operate under net oxidizing conditions during some modes of operations, e.g., high speed cruise, when the engine is at normal operating temperature, and that the presence of occasional oxidizing conditions does not adversely affect the exhaust gas treatment system and process herein so long as the average air-fuel ratio is at least slightly net reducing both during cold engine operation and during warm engine operation.

EXAMPLE

In order to illustrate the advantages of this invention, a 350-cubic inch displacement Chevrolet V-8 test vehicle (1970 model) was equipped on each side of the engine with a dual catalyst system consisting of a nitrogen oxide-reduction catalyst comprising a nickel-copper alloy followed by an Engelhard PTX-5 oxidation catalyst, said oxidation catalyst comprising platinum on a ceramic honeycomb shape base. In order to provide reducing conditions over the nickel-copper allow catalyst, carburation to the engine was adjusted net rich; that is, more than the stoichiometic amount of fuel was used. Secondary air was injected between the nickel-copper alloy catalyst and the oxidation catalyst; said secondary air being supplied by an engine-driven air-pump. In order to obtain the most rapid catalyst system warm-up, 460 grams of nickel-copper alloy catalyst were used on each side of the engine; the catalyst was placed in a reactor attached to the outlet end of the exhaust manifold. Both the exhaust manifolds and the catalyst reactors were coated with about 2 cm of castable refractory insulation.

Warm-up tests were conducted using the 1972 U.S. Government Federal Emission Test Procedure. This procedure involved starting the test vehicle from an equilibrated temperature of 20°-30°C., which was also the initial catalyst temperature. In order to start an engine under these conditions, the engine was choked; that is, operated at an air-fuel ratio of about 12 kilograms air per kilogram of fuel. (The stoichiometic air/fuel weight ratio was 14.6). Under these conditions, the engine produced an exhaust containing large quantities of carbon monoxide and unburned hydrocarbons and very little oxygen; the exhaust temperature being low and the nickel-copper alloy catalyst warm-up being slow. Catalyst temperature, as measured by a Chromel-Alumel thermocouple placed in the center of the catalyst bed reached 600°C. in 30 seconds but did not rise higher in the next 30 seconds. Carbon monoxide emissions as measured by the 1972 test procedure mentioned above were in excess of 2.5 grams/kilometer. Using the air injection procedure of the present invention allowed further warm up of the catalyst during the critical period between 30 and 60 seconds after cold start by adding 10% by volume of air, based on total exhaust flow. (Both air and exhaust gas volumes refer to standard temperature and pressure). The resulting air-exhaust gas mixture contained less than the stoichiometric quantity of air. Carbon monoxide emissions were reduced thereby to 0.6 gram/kilometer while the catalyst temperature reached 875°C. in 45 seconds; equivalent nitrogen oxides emissions of about 0.2 gram/kilometer were obtained both with and also without the air injection of the present invention.

What is claimed is:

1. In a method for removing pollutants from the exhaust gas of an internal combustion engine in which fuel is burned with air at a substantially less than stoichiometric air-fuel ratio during cold engine operation and at a greater but substoichiometric air-fuel ratio during warm engine operation and in which the exhaust gas is contacted under net reducing conditions with a nitrogen oxide reduction catalyst in a first conversion zone and is then treated with added secondary air under net oxidizing conditions in a second conversion zone to oxidize carbon monoxide and hydrocarbons, the improvement which comprises:

a. supplying a quantity of primary air not greater than stoichiometric to said first conversion zone and a further quantity of secondary air at least stoichiometrically equivalent to the amount of CO present, to said second conversion zone, said primary air being supplied during cold engine operation and said secondary air being supplied at all times during operation of the engine;

b. shutting off the supply of primary air to said first conversion zone when the average air-fuel ratio reaches substantially its normal warm engine value; and c. continuing operation without substantial addition of external air to said first conversion zone.

2. The improvement of claim 1 wherein the nitrogen oxide reduction catalyst in the first conversion zone is an alloy of nickel and copper containing from about 40 to about 95% by weight of nickel and 5 to about 60% by weight of copper.

3. The improvement of claim 2 wherein the quantity of air supplied to the first conversion zone is gradually decreased.

4. The improvement of claim 3 wherein said decrease is proportional to the increase in the air-fuel ratio to the engine.

5. The improvement of claim 3 wherein said gradual decrease is proportional to an increase in the cooling water temperature.

6. The improvement of claim 3 wherein said gradual decrease is proportional to the temperature increase in the second stage conversion zone.

* * * * *